US007689834B2

(12) United States Patent
Igarashi

(10) Patent No.: US 7,689,834 B2
(45) Date of Patent: Mar. 30, 2010

(54) PERSONAL AUTHENTICATION APPARATUS

(75) Inventor: Yasuhiro Igarashi, Maebashi (JP)

(73) Assignees: Fujitsu Limited, Kawasaki (JP); Fujitsu Frontech Limited, Tokyo (JP)

(*) Notice: Subject to any disclaimer, the term of this patent is extended or adjusted under 35 U.S.C. 154(b) by 1115 days.

(21) Appl. No.: 11/086,917

(22) Filed: Mar. 23, 2005

(65) Prior Publication Data

US 2006/0143471 A1 Jun. 29, 2006

(30) Foreign Application Priority Data

Dec. 24, 2004 (JP) ............................ 2004-374080

(51) Int. Cl.
*G06F 21/00* (2006.01)
*G06F 7/04* (2006.01)

(52) U.S. Cl. .......................... 713/186; 713/182; 726/2; 726/20

(58) Field of Classification Search ................. 713/186, 713/182; 726/2, 20
See application file for complete search history.

(56) References Cited

U.S. PATENT DOCUMENTS

| | | | | |
|---|---|---|---|---|
| 5,764,789 | A * | 6/1998 | Pare et al. | 382/115 |
| 2002/0099809 | A1* | 7/2002 | Lee | 709/223 |
| 2002/0129254 | A1* | 9/2002 | Kuroda | 713/176 |
| 2003/0074568 | A1 | 4/2003 | Kinsella et al. | |
| 2004/0010724 | A1* | 1/2004 | Brown et al. | 713/202 |
| 2004/0071322 | A1 | 4/2004 | Choshi et al. | |
| 2004/0162870 | A1* | 8/2004 | Matsuzaki et al. | 709/200 |
| 2005/0149742 | A1* | 7/2005 | Weis | 713/186 |
| 2005/0165797 | A1* | 7/2005 | Nair | 707/100 |
| 2008/0147821 | A1* | 6/2008 | Dietrich et al. | 709/216 |

FOREIGN PATENT DOCUMENTS

| | | |
|---|---|---|
| JP | 11-338947 | 12/1999 |
| JP | 2001-134338 | 5/2001 |
| JP | 2001-273498 | 10/2001 |
| JP | 2001-290959 | 10/2001 |
| JP | 2001-338295 | 12/2001 |
| JP | 2003-85539 | 3/2003 |
| JP | 2004-112172 | 4/2004 |
| KR | 20020023310 | 3/2002 |

OTHER PUBLICATIONS

Chinese Office Action dated Jul. 13, 2007 issued in corresponding Application No. 200510063489.8.

* cited by examiner

*Primary Examiner*—William R Korzuch
*Assistant Examiner*—Sarah Su
(74) *Attorney, Agent, or Firm*—Westerman, Hattori, Daniels & Adrian, LLP

(57) ABSTRACT

The present invention provides a personal authentication apparatus that includes a permissibility information file for registering information indicating whether setting an ID common to more than one person is permitted or not. In the apparatus, only if setting of an ID common to more than one person is prohibited, an information registering section refers to the permissibility information file to check whether or not a first ID currently obtained for registration is identical to any of second IDs stored in an information storing section. Then, only if the first ID differs from any of the second IDs, the information registering section registers the first ID and biometric information currently obtained in an information storing section.

5 Claims, 12 Drawing Sheets

(A) When identical IDs are not used

| Personal information DB | |
|---|---|
| •ID=0001<br>•Biometric information 1 | User personal information |
| •ID=0002<br>•Biometric information 2 | |
| •ID=0003<br>•Biometric information 3 | |
| •ID=0004<br>•Biometric information 4 | |
| •ID=0005<br>•Biometric information 5 | |
| ⋮ | |
| •ID=9901<br>•Biometric information 5001 | Administrator personal information |
| •ID=9902<br>•Biometric information 5002 | |
| ⋮ | |

(B) When more than one identical IDs are used

| Personal information DB | |
|---|---|
| •ID=0101<br>•Biometric information 1 | User personal information |
| •ID=0101<br>•Biometric information 2 | |
| •ID=0101<br>•Biometric information 3 | |
| •ID=0102<br>•Biometric information 4 | |
| •ID=0102<br>•Biometric information 5 | |
| ⋮ | |
| •ID=9901<br>•Biometric information 9901 | Administrator personal information |
| •ID=9902<br>•Biometric information 9902 | |
| ⋮ | |

Fig. 5

PERSONAL AUTHENTICATION APPARATUS

BACKGROUND OF THE INVENTION

1. Field of the Invention

The present invention relates to a personal authentication apparatus that registers biometric information unique to each individual person, and obtains the person's biometric information anew when performing authentication, and checks it against the registered biometric information to authenticate the person.

2. Description of the Related Art

Facilities and equipment that require personal authentication for the opening and closing entrance doors of rooms or buildings or operating information processing devices in order to improve security or protect privacy have proliferated in recent years. For such authentication, code numbers have been widely used traditionally. In recent years, more secure personal authentication methods are becoming widespread in which sensors are provided to detect some biometric information unique to every individual, such as fingerprints or palm or pupil vein patterns, for performing personal authentication (see Japanese Patent Laid-Open No. 2003-85539 and No. 2004-112172).

A problem with a code number is that, if it is known to another person, the person can readily impersonate the holder of the code number. In contrast, personal authentication that relies on biometric information, which varies from person to person, can significantly reduce threat of impersonation.

In a system in which biometric information is used for personal authentication, IDs are associated with the biometric information and used in addition to the biometric information for greater security or for convenience of management (Japanese Patent Laid-Open No. 11-338947 and No. 2001-290959).

When biometric information is used in combination with an ID, a problem arises as to whether different IDs should be assigned to different individuals. For example, for controlling access of workers to a factory or an office building, it is desirable that IDs be unique to individual workers, whereas for controlling access to a complex housing such as a condominium, IDs unique to individual dwelling units, rather than to individuals, are preferable because the dwellers may include young children and elderly people. In the latter case, the same ID may be assigned to a number of people.

SUMMARY OF THE INVENTION

The present invention has been made in view of the above circumstances and provides a personal authentication apparatus suitable for both of the above cases of assigning IDs.

The present invention provides a personal authentication apparatus having: an information obtaining section which obtains personal biometric information; an information storing section which stores personal biometric information obtained by the information obtaining section in the past; and an authenticating section which checks biometric information currently obtained by the information obtaining section against biometric information stored in the information storing section to authenticate a person associated with the currently obtained biometric information, wherein:

the information obtaining section obtains the ID of the person in addition to the biometric information on the person, and the information storing section stores an ID and biometric information obtained in the past by the information obtaining section in association with each other, the personal authentication apparatus including:

an information registering section which causes the information obtaining section to obtain a new person's ID and biometric information for information registration and associates and registers the obtained ID with the obtained biometric information in the information storing section; and a permissibility information file in which information indicating whether setting an ID common to more than one person is permitted or not is registered, wherein the information registering section refers to the permissibility information file and, only if setting of an ID common to more than one person is prohibited, the information registering section checks whether or not a first ID currently obtained by the information obtaining section for registration is identical to second IDs stored in the information storing section, and only if the first ID differs from any of the second IDs, the information registering section registers the ID and biometric information currently obtained by the information obtaining section in the information storing section.

The personal authentication apparatus according to the present invention has the permissibility information file, which is referred to before an ID and biometric information are registered. Only if setting of an ID common to more than one person is prohibited, it is checked whether a first ID currently obtained by the information obtaining section for registration is the same as second IDs stored in the information storing section and, if the first ID differs from any of the second IDs, the ID and biometric information currently obtained by the information obtaining section are registered in the information storing section. Accordingly, the personal authentication apparatus is suitable for both of a system that has IDs uniquely identifying individual persons and a system in which more than one person shares the same ID.

In the personal authentication apparatus, when an ID and biometric information is obtained by the information obtaining section for authentication, preferably the authenticating section retrieves biometric information associated and stored with the same ID as the obtained ID from the information storing section and checks the biometric information currently obtained by the information obtaining section for authentication against the biometric information retrieved from the information storing section.

It is possible that only biometric information is used for authentication without using an ID during the authentication. However, more accurate authentication can be achieved by using both ID and biometric information for authentication.

Preferably, the information obtaining section in the personal authentication apparatus of the present invention includes a biometric information sensor which detects biometric information. Typically, the biometric information sensor may be a sensor that detects palm vein patterns.

Furthermore, the information registering section in the personal authentication apparatus of the present invention preferably registers in the information storing section a new personal ID and biometric information obtained by the information obtaining section for registration if the authenticating section authenticates an administrator who is a specific person among the persons whose IDs and biometric information are stored in the information storing section.

The security of registration is ensured by allowing new registration by authenticating an administrator.

As has been described above, according to the present invention, a personal authentication apparatus suitable for both of a system in which sharing of IDs are prohibited and a system in which sharing of IDs are allowed is configured.

BRIEF DESCRIPTION OF THE DRAWINGS

FIG. 5 shows information in a personal information database;

DETAILED DESCRIPTION OF THE INVENTION

An embodiment of the present invention will be described below.

Figure 1:
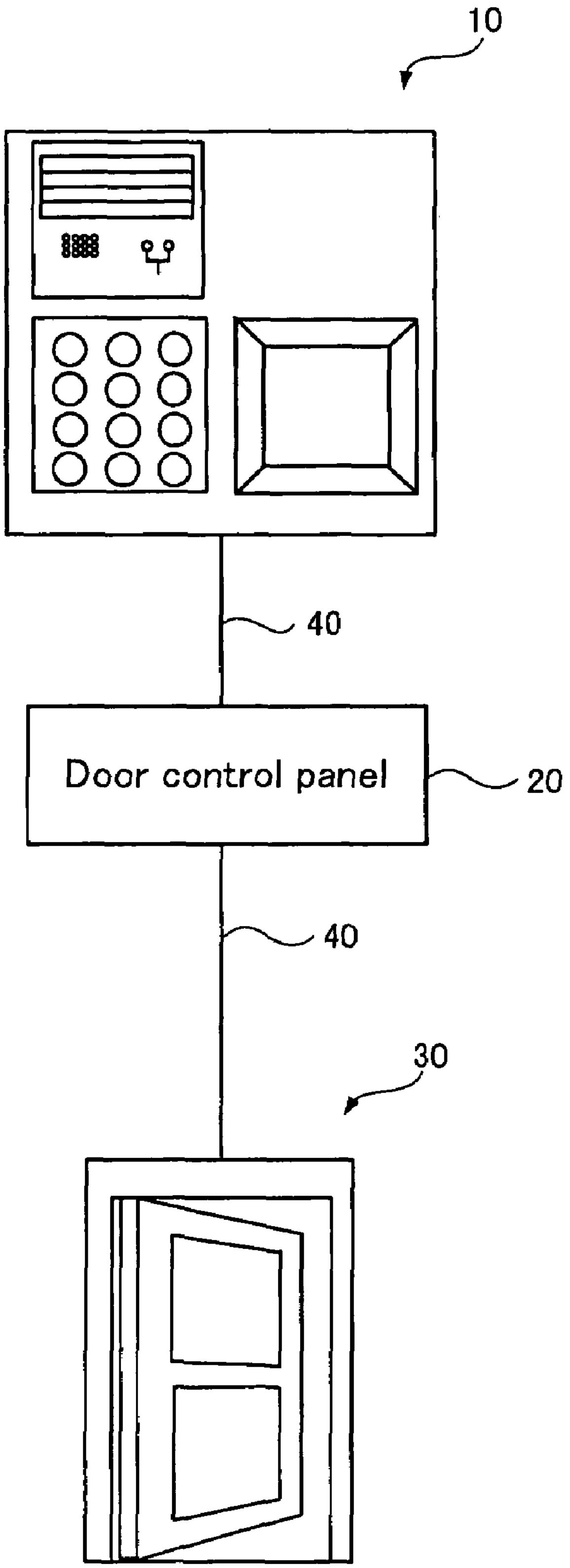
FIG. 1 shows an overview of a door open/close system in which a personal authentication apparatus according to one embodiment of the present invention is incorporated.

FIG. 1 shows an overview of a door open/close system in which a personal authentication apparatus is incorporated according to one embodiment of the present invention.

Shown in FIG. 1 are, a gate controller 10, a door control panel 20, and a door 30, which are interconnected through a line 40.

The door 30 is provided at the entrance of a building or a condominium or a room, for example, and includes an electric lock (not shown), which is locked and unlocked through control from the door control panel 20.

The door control panel 20 drives the electric lock of the door 30 over the line 40 under the control of the gate controller 10.

The gate controller 10 is provided near the door 30, performs personal authentication to determine whether a person is authorized to pass through the entrance at which the door 30 is provided and, if it determines that the person is authenticated to pass through the entrance, provides a control signal to the door control panel 20 to cause it to unlock the electric lock.

Figure 2:
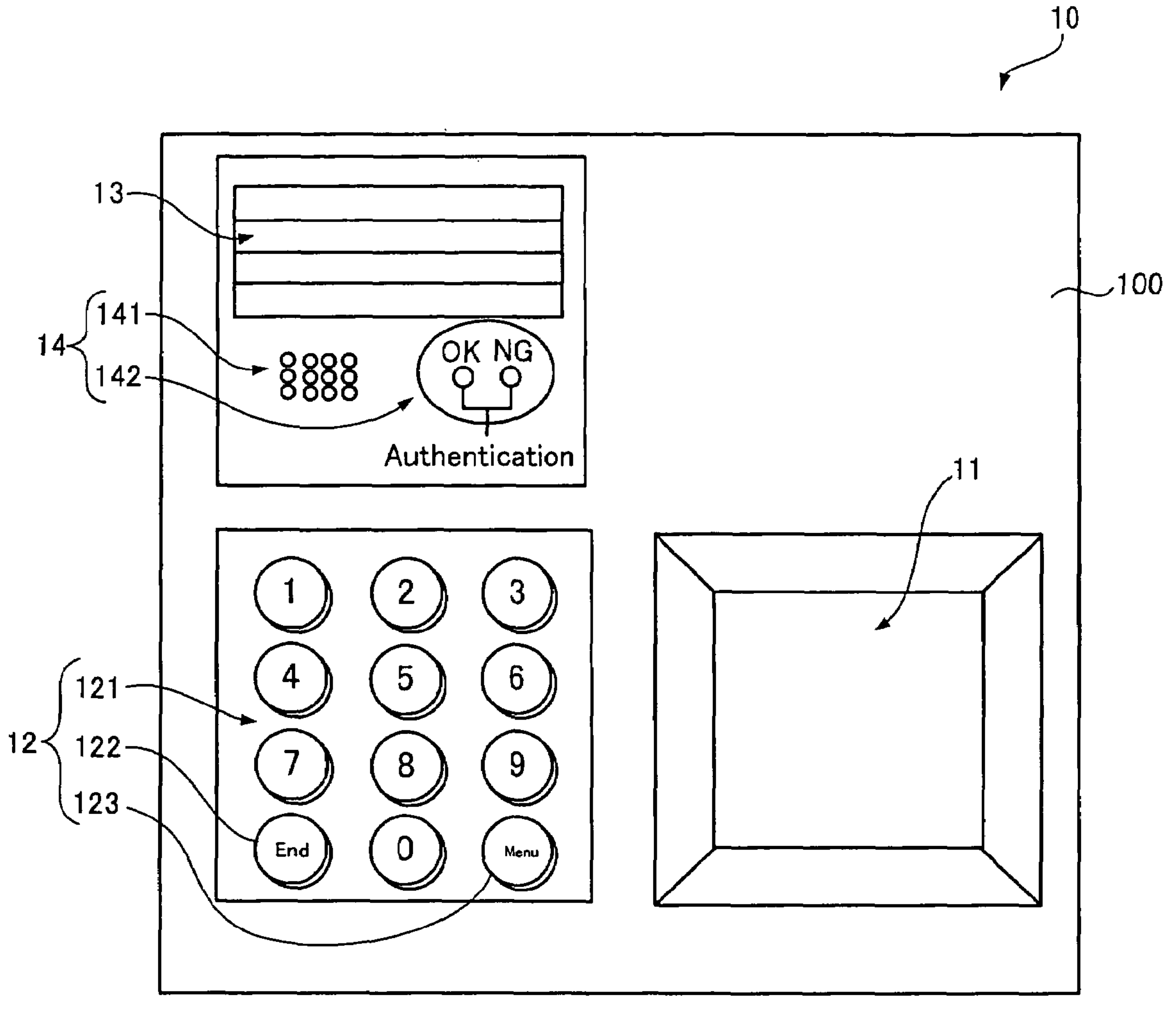
FIG. 2 shows an operation panel of a gate controller.

FIG. 2 shows an operation panel on the gate controller 10.

Provided on the operation panel 100 of the gate controller are a biometric information sensor 11, a keyboard 12, an input/output display 13, and alarm mechanism 14.

The biometric information sensor 11 detects palm vein patterns. When a palm is placed over the biometric information sensor 11, the sensor 11 detects the vein pattern on the palm placed over the biometric information sensor 11 by using infrared rays.

The keyboard 12 includes a ten-key pad 121 labeled with numbers 0 to 9, an end key 122, and a menu key 123, which are push buttons to be depressed for inputting a user ID or using a control function of the gate controller 10.

The input/output display 13 displays the result of execution of a control function of the gate controller 10, operation guidance for users, an alarm message or the like.

The alarm mechanism 14 includes an audio output section 141 having a speaker inside it and a light emitting section 142 in which LEDs are provided and indicates the result of authentication by producing sound and turning on a lamp.

Figure 3:
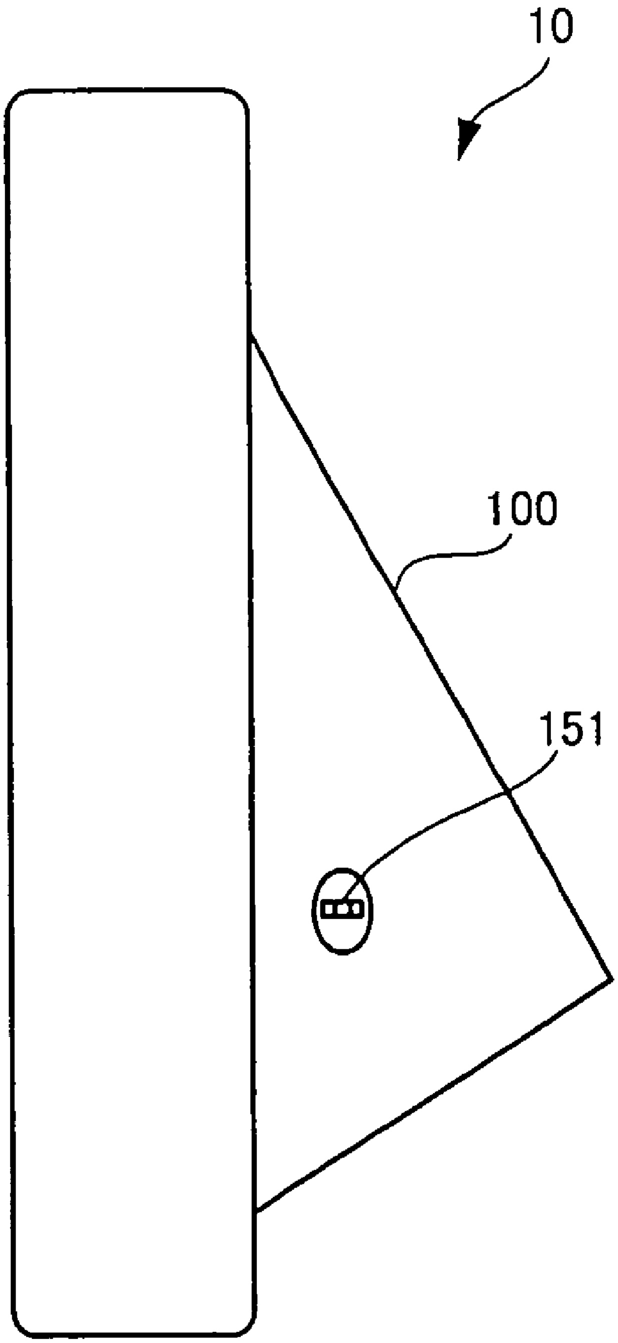
FIG. 3 shows a side view of the gate controller.

FIG. 3 is a side view of the gate controller 10.

The gate controller 10 has a structure intended to be mounted on a wall in a building or room near the door 30 shown in FIG. 1. The operation panel 100 is slanted upward. Provided on a side wall of the gate controller 10 is a keyhole 151 into which a physical key is fit. When a specific key is inserted into the keyhole 151, the inserted key can be turned to a predetermined angle. When the key is inserted and turned, the gate controller 10 recognizes that it is operated by a right key. In the present embodiment, inserting and turning a right key in the keyhole 151 is referred to as setting a key.

Figure 4:
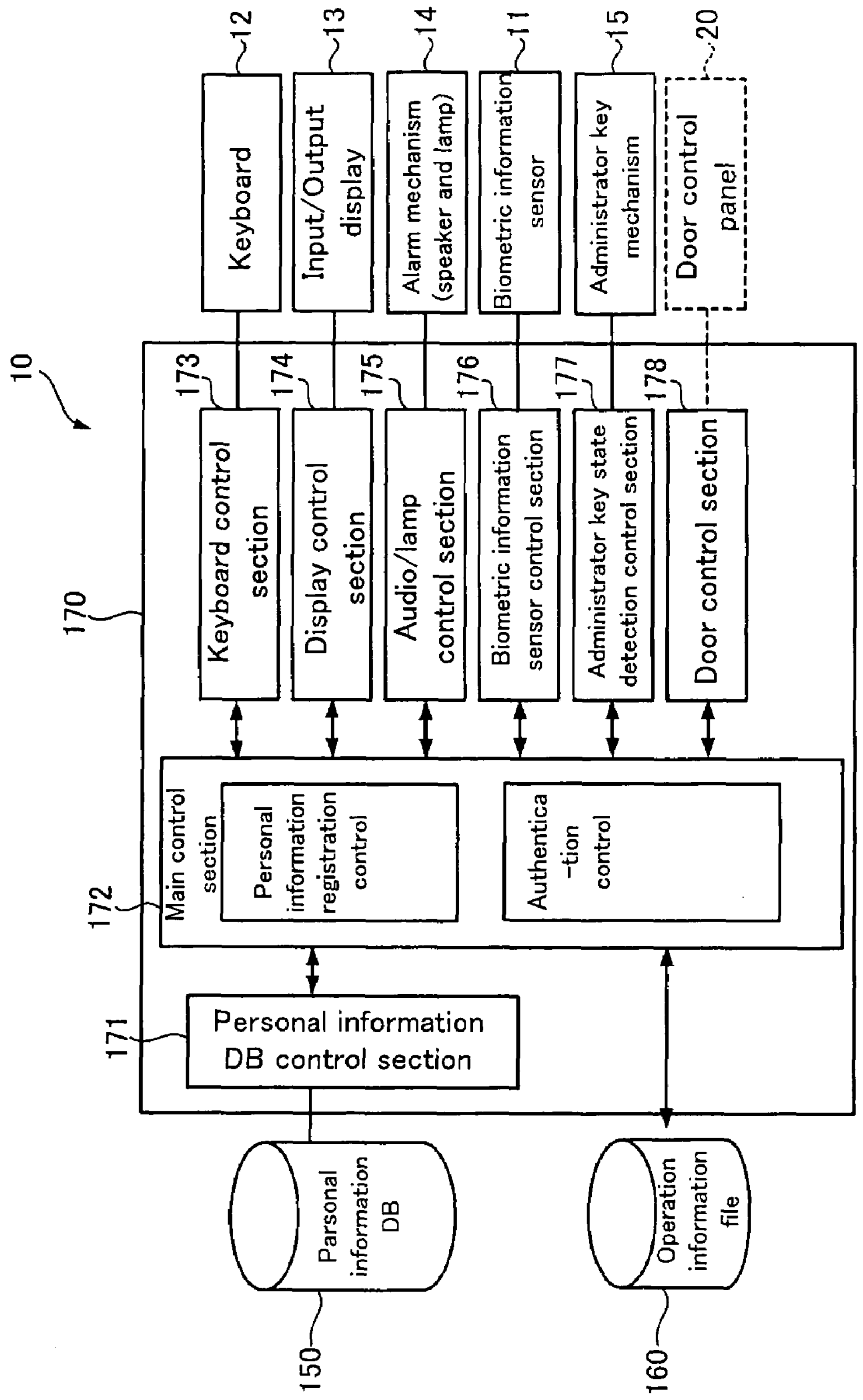
FIG. 4 is a block diagram showing a configuration of the gate controller.

FIG. 4 is a block diagram showing a configuration of the gate controller 10.

Shown in FIG. 4 are personal information database (DB) 150, an operation information file 160, and a control section 170, as well as the keyboard 12, input/output screen 13, alarm mechanism 14, and biometric information sensor 11, which are also shown in FIG. 2. An administrator key mechanism 15 including the keyhole 151 shown in FIG. 3 is also provided.

Personal information is registered in the personal information DB 150.

FIG. 5 shows information stored in the personal information DB 150.

There are two types of personal information registered in the personal information DB: one type is used in a case where there is no identical IDs and a unique ID is assigned to each individual as shown in part (A) and the other is used in a case where there is more than one identical IDs and an identical ID is shared by more than one person as shown in part (B). These two types of information are not used in combination; instead one of the two types is chosen for one personal authentication apparatus.

For both cases (A) and (B) shown in FIG. 5, personal information on users who are authorized to pass through the door 30 and personal information on administrators who take care of the building including the door 30 shown in FIG. 1 are registered in the personal information DB.

Each item of personal information shown in part (A) of FIG. 5 consists of a combination of an ID and biometric information (palm vein pattern, in this example) which identify the person.

For the information shown in part (B) of FIG. 5, IDs are apartment numbers, for example, and therefore the dwellers of the apartment with the same apartment number have the same ID. Except for this difference, the information shown in part (B) of FIG. 5 is the same as the information shown in part (A) of FIG. 5, and each item of personal information of type B also consists of a combination of an ID and biometric information (palm vein pattern).

Each of the user IDs and administrator IDs is a four-digit number. The first two digits of a user ID are any numbers except "99" and the first two digits of an administrator ID are "99", which allows the person to be identified as administrator.

Figure 6:
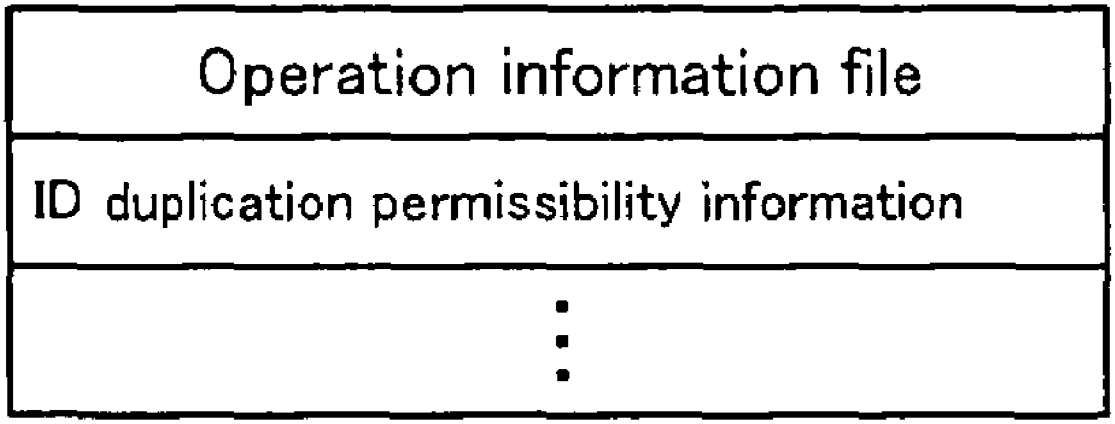
FIG. 6 shows information in an operation information file.

FIG. 6 shows a portion of the information in the operation information file shown in FIG. 4.

Stored in the operation information file 160 shown in FIG. 4 are ID duplication permissibility information indicating whether duplicate IDs are prohibited or not, and other information such as information about the operation of the personal authentication apparatus (for example, a list of the apartment numbers (a list of the numbers allowed to be used as IDs) of the condominium where the apparatus is installed and information indicating the number of administrators, if the number of the administrators are restricted).

Also recorded in the operation information file 160 shown in FIG. 4 are various kinds of information to be used for operations such as display patterns to be displayed on the input/output display 13 and audio patterns to be presented to users through the alarm mechanism 14.

Turning back to FIG. 4, the description will be continued.

The control section 170 includes a personal information DB control section 171, a main control section 172, a keyboard control section 173, a display control section 174, an audio/lamp control section 175, a biometric information sensor control section 176, an administrator key state detection control section 177, and a door control section 178.

The personal information DB control section 171 is responsible for accessing the personal information DB 150 according to instructions from the main control section 172.

The main control section 172 is responsible for controlling the registration of personal information and controlling authentication. Control by the main control section 172 will be described later.

The keyboard control section 173 is responsible for detecting operations on the keyboard 12 and communicating them to the main control section 172. The display control section 174 displays information such as IDs on the input/output display 13 in response to instructions from the main control section 172.

The audio/lamp control section 175 controls the speaker and lamps provided in the alarm mechanism 14 in response to an instruction from the main control section 172. The biometric information sensor control section 176 controls the biometric information sensor 11 to detect a palm vein pattern and sends the detected palm vein pattern to the main control section 172. The administrator key state detection control section 177 is responsible for determining whether a key is inserted and turned (is set) in the keyhole 151 (see FIG. 3) of the administrator key mechanism 15 and sending the result of the determination to the main control section 172. The door control section 178 outputs a control signal for locking or unlocking the electric lock of the door 30 (see FIG. 1) to the door control panel 20 in response to an instruction from the main control section 172.

Personal information registration control and authentication control performed in the main control section 172 will be described below.

Figure 7:
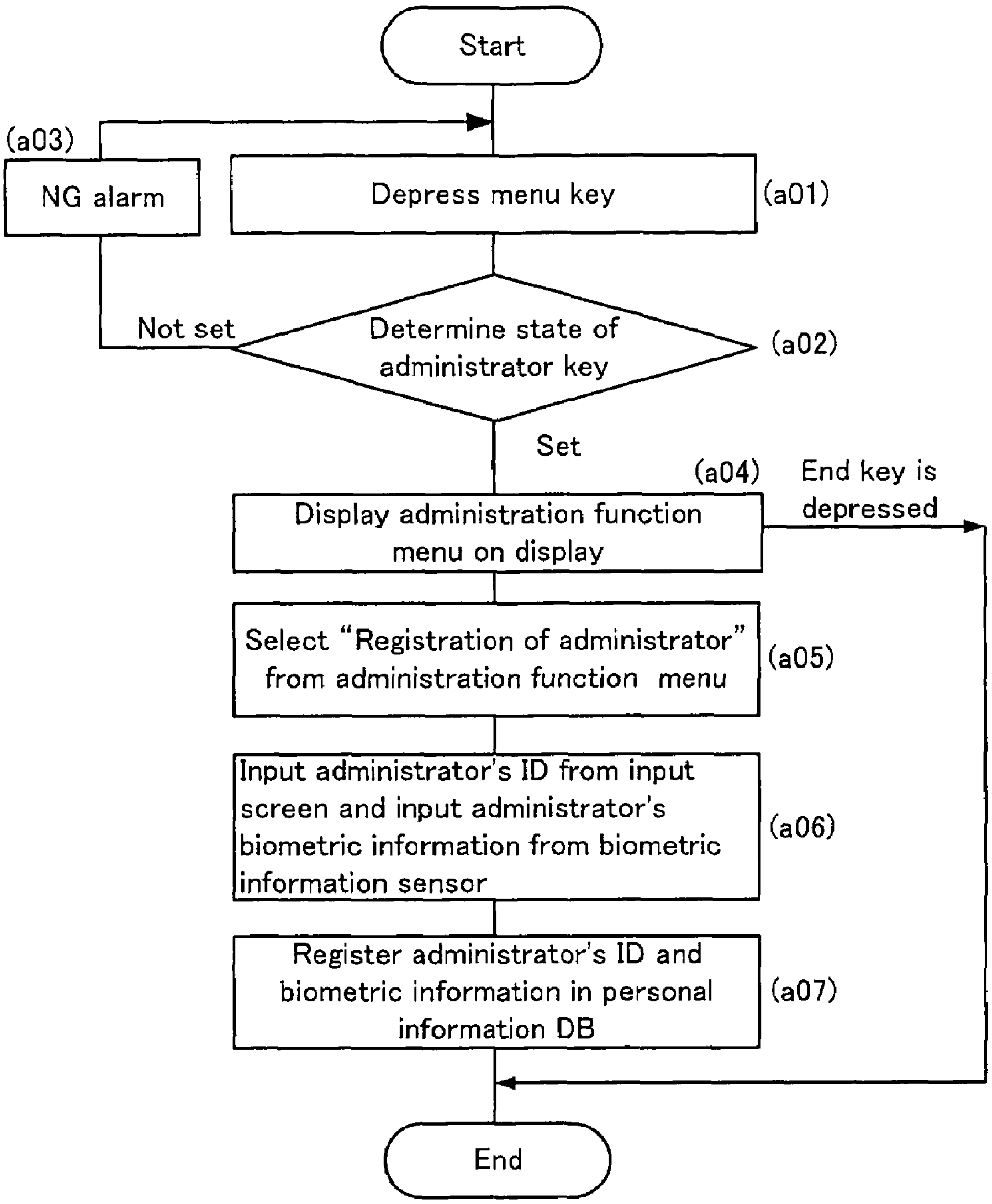
FIG. 7 shows a control flow for registering an administrator.

FIG. 7 shows a control flow during registration of an administrator.

First, the menu key 123 on the keyboard 12 shown in FIG. 2 is depressed (step a01) and the state of an administrator key is determined in response to the depression of the menu key 123 (step a02). The determination as to the state of an administrator key herein is determination whether a predetermined key is inserted and turned (is set) in the keyhole 151 shown in FIG. 3. If the key is not set, an NG alarm is generated (step a03).

If the menu key 123 is depressed and it is determined that the administrator key is set, an administration function menu is displayed (step a04).

Figure 8:
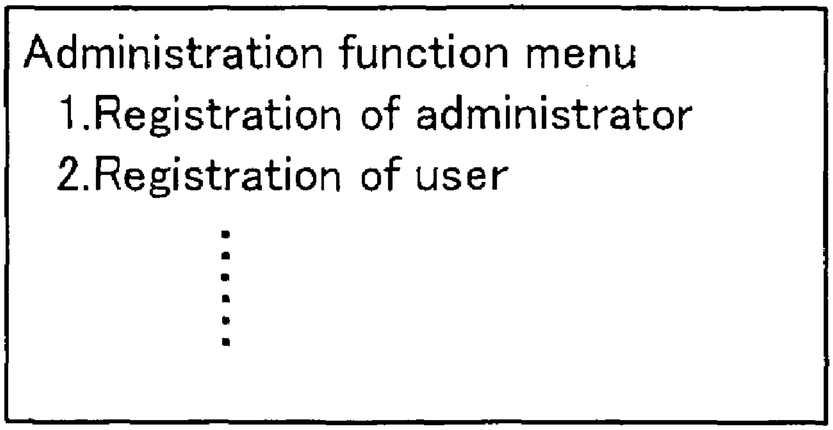
FIG. 8 shows an administration function menu.

FIG. 8 shows the administration function menu.

Displayed on the menu are "1. Registration of administrator information", "2. Registration of user information", and other options. When the "1" key on the keyboard 12 (see FIG. 2) is depressed while the administration function menu is displayed, execution of the "Registration of administrator information" is selected (step a05).

It should be noted that if the end key 122 shown in FIG. 2 is depressed while the administration function menu is displayed, the administration function will end without any operation being performed.

Next, an ID and biometric information for registering the administrator is inputted (step a06 in FIG. 6).

Figure 9:
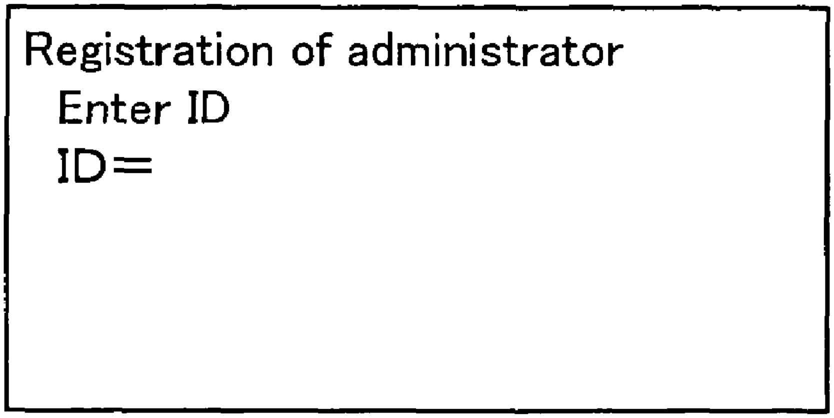
FIG. 9 shows an ID input screen displayed during registration of administrator.

FIG. 9 shows an ID input screen for registering an administrator.

When the "Registration of administrator information" is selected, the screen shown in FIG. 9 is displayed prompting the operator to input an administrator ID to be registered. When an ID is inputted through the ten-key pad 121 on the keyboard 12 shown in FIG. 2, the inputted ID is displayed on the ID input screen shown in FIG. 9. Only administrator IDs that have "99" as their first two digits and are not identical to the ID of an administrator already registered are accepted. After inputting the ID, the operator places one of his or her palms over the biometric information sensor 11 to cause it to detect the palm vein pattern.

Then, the ID and biometric information thus inputted are registered in the personal information DB 150 (see FIGS. 4 and 5) (step a07 in FIG. 7).

Figure 10:
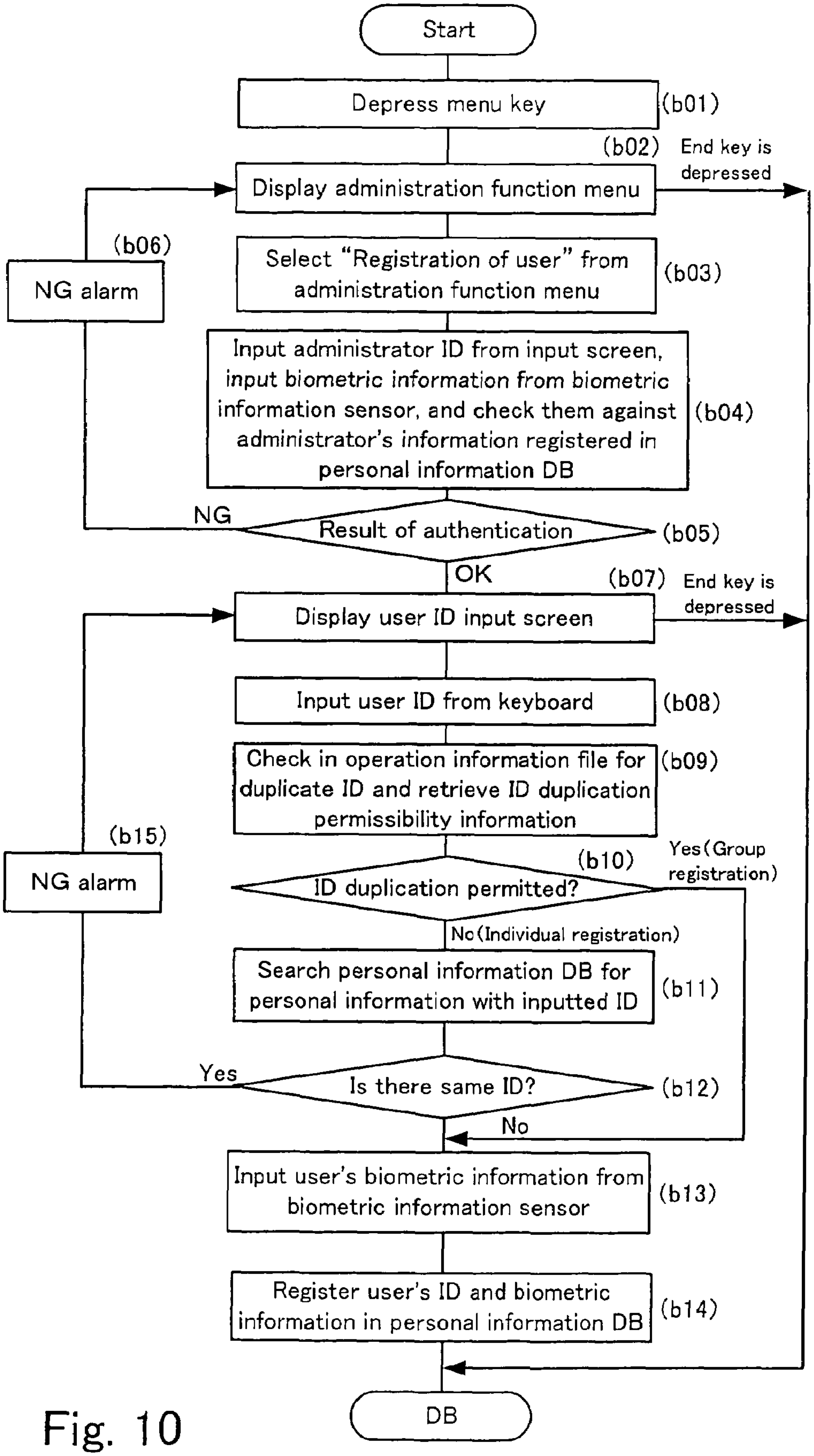
FIG. 10 shows a control flow for registering a user.

FIG. 10 shows a control flow during user registration.

When the menu key 123 on the keyboard 12 shown in FIG. 2 is depressed (step b01), the administration function menu shown in FIG. 8 is displayed (step b02). If the end key 122 shown in FIG. 2 is depressed at this stage, the execution of the administration function will end without anything being performed.

After the "Registration of user information" is selected by depressing the "2" key on the key board 12 while the administration function menu shown in FIG. 8 is displayed on the input/output display 13 (step b03), the ID of an administrator and the administrator's biometric information are inputted and are checked against the administrator's information stored in the personal information DB to perform authentication of the administrator (step b04). If the result of the authentication of the administrator is NG (step b05), an NG alarm is generated (step b06), whereas if the authentication is successful, a user ID input screen is displayed on the input/output display 13 (step b07).

Figure 11:
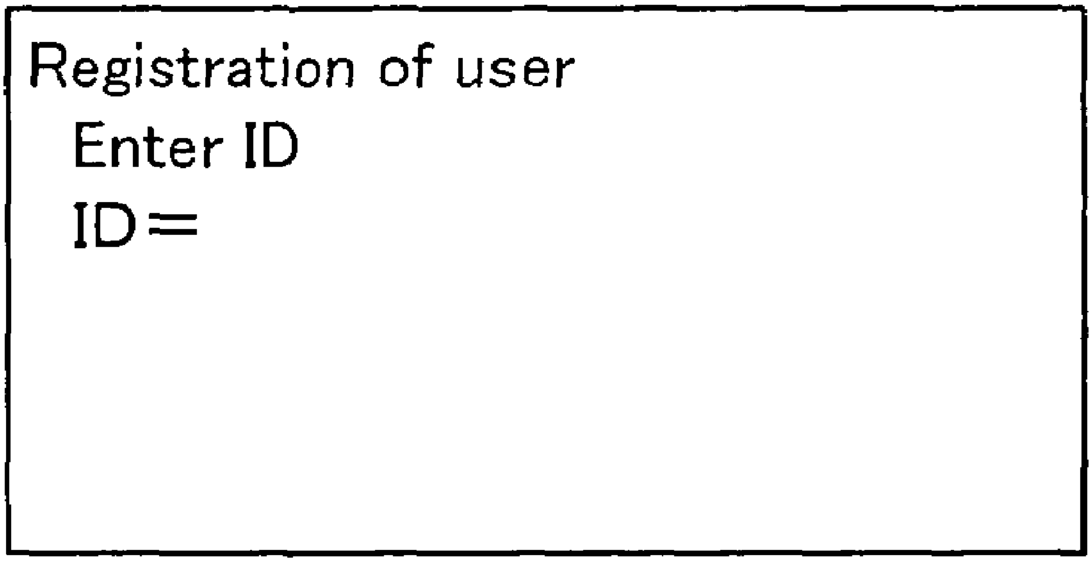
FIG. 11 shows a user ID input screen displayed during user registration.

FIG. 11 shows the user ID input screen displayed during user registration.

After the ID input screen shown in FIG. 11 is displayed on the input/output display 13 shown in FIG. 2, a user ID is inputted through the ten-keypad 121 (step b08). Then, the inputted ID is displayed on the screen for confirmation by the user.

If the end key 122 is depressed while the user ID input screen shown in FIG. 11 is displayed on the input/output display 13, the administration function will end without any operation being performed.

When a user ID is inputted, then ID duplication permissibility information is retrieved from the operation information file (see FIG. 6) (step b09). If no duplicate ID is permitted (step b10), the personal information in the personal information DB (see FIG. 5) is searched for the inputted ID (step b11) and whether there is an ID identical to the inputted one or not is determined (step b12). If there is an identical ID, a NG alarm is generated to request a different ID (step b15).

On the other hand, if it is determined that there is no ID identical to the inputted ID in the personal information DB (step b12) or if the ID duplication permissibility information obtained from the operation information file indicates that a duplicate ID is permitted (step b10), the process proceeds to step b13, where the user place one of his/her palms over the biometric information sensor 11 to input the user's biometric information. The inputted user ID and the user's biometric information are registered in the personal information DB (step b14).

Thus, according to the present invention, as shown in the flow of FIG. 10, a personal authentication apparatus suitable for both of a system in which duplicate IDs are prohibited and a system in which more than one identical ID is allowed to be used is implemented.

Figure 12:
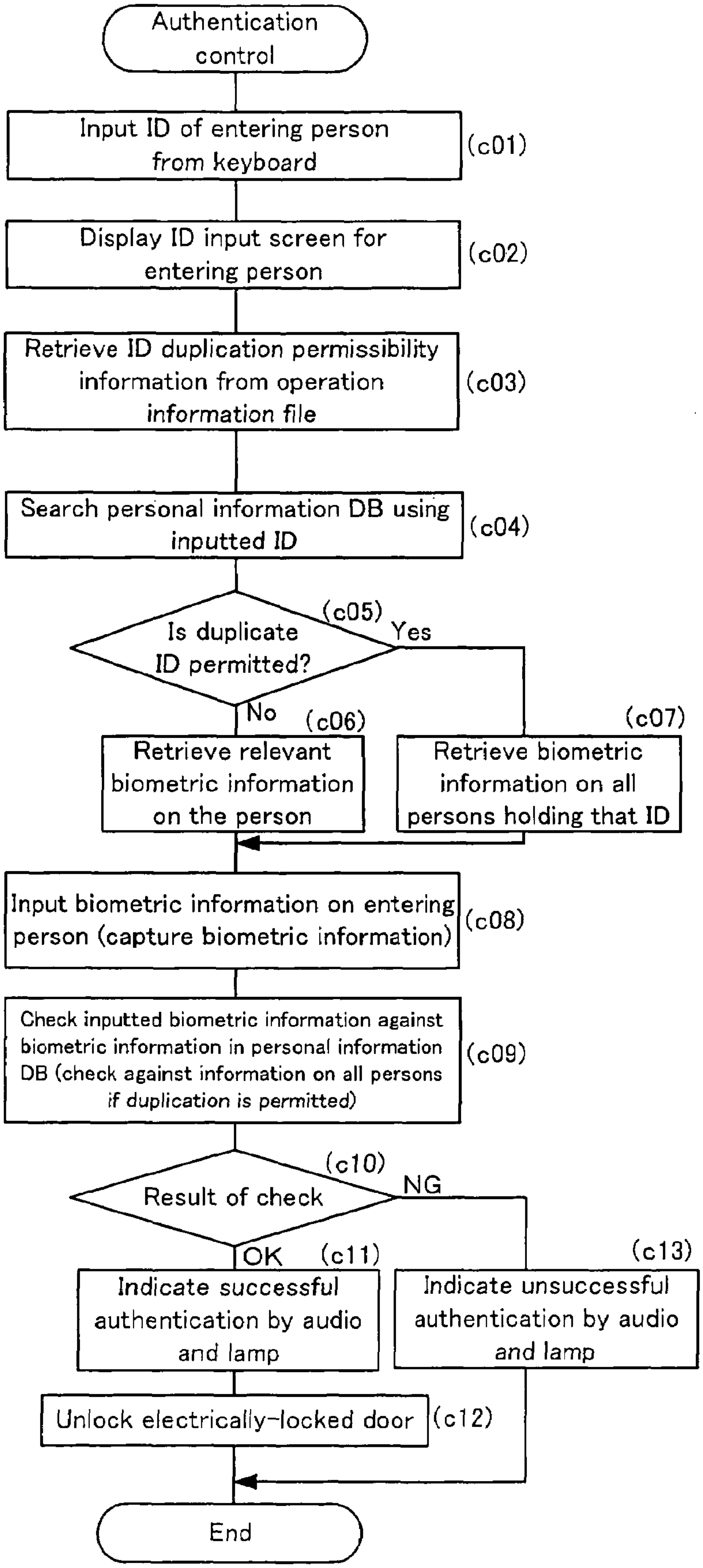
FIG. 12 shows a control flow for authenticating a user.

FIG. 12 shows a control flow for user authentication.

The ID of a person who wants to enter inside through the door is inputted through the keyboard (step c01) and the inputted ID is displayed on the input/output display 13 (step c02).

Figure 13:
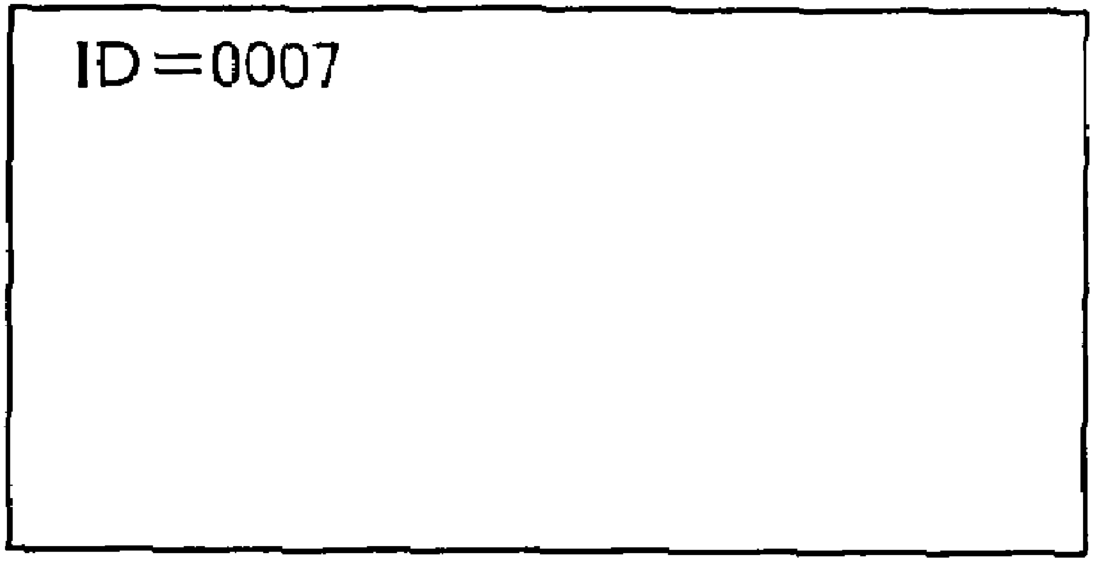
FIG. 13 shows an input/output display on which an inputted ID is displayed.

FIG. 13 shows the input/output display on which the inputted ID is displayed.

In this example, "0007" is inputted.

Referring back to FIG. 12, the description of the control flow is continued.

After the ID of the person is inputted as described above, ID duplication permissibility information is retrieved from the operation information file (see FIG. 6) (step c03), the ID duplication permissibility information is referred to and the personal information DB is searched using the inputted ID (step c04). If the ID duplication permissibility information indicates that no duplicate IDs are allowed (step c05), biometric information on the one person who holds the ID is retrieved from the personal information DB (step c06) If the ID duplication permissibility information indicates that duplicate IDs are allowed (step c05), biometric information on all the users who hold the ID is retrieved from the personal information DB (step c07).

The entering person places one of his/her palms over the biometric information sensor 11 to input biometric information (step c08). The inputted biometric information is checked against the biometric information retrieved from the personal information DB (step c09). If the ID duplication permissibility information retrieved from the operation information file indicates that duplicate IDs are allowed, the check is made against information on all users who hold the same ID as the ID inputted by the entering person.

If it is determined as the result of the check that the person is registered as a user (step c10), the successful authentication is indicated by audio and lamp indication (step c11) and the electric lock is unlocked (step c12). On the other hand, if it is determined as the result of the authentication that the person is not registered as a user (step c10), the unsuccessful authentication is indicated by audio and lamp indication (step c13).

While, beside the processes described above, other processes such as deletion of a user or an administrator and change of an ID may be performed in the gate controller 10, they are not subjects herein and therefore the description of which is omitted.

While palm vein patterns are used as biometric information in the example described above, the biometric information is not limited to palm vein patterns. Other biometric information such as pupil vein patterns, fingerprints, or faces by which individuals can be recognized may be used.

While personal authentication is performed and the result is used for controlling the opening and closing of a door in the example described above, the usage of the result of personal authentication is no object in the present invention. The present invention can be used in any applications.

What is claimed is:

1. A personal authentication apparatus having an information obtaining section which obtains biometric information of a person, an information storing section which stores the biometric information of a person obtained in the past by the information obtaining section, and an authenticating section which checks the biometric information currently obtained by the information obtaining section against the biometric information stored in the information storing section to authenticate a person associated with the currently obtained biometric information, wherein:

the information obtaining section obtains an ID of the person in addition to the biometric information of the person, and the information storing section associates and stores the ID of the person with the biometric information obtained in the past by the information obtaining section, the personal authentication apparatus comprising:

an information registering section which causes the information obtaining section to obtain an ID of a new person and biometric information of the new person for registration and associates and registers the ID of the new person with the biometric information of the new person in the information storing section; and a permissibility information file which stores information indicating whether or not setting and registering of a duplicate ID, which is the same as an ID already registered in the information storing section and will be shared by a plurality of persons, is permitted, wherein the information registering section refers to the permissibility information file and, when the information stored therein indicates that setting and registering of the duplicate ID, which is the same as an ID already registered in the information storing section and will be shared by a plurality of persons, is prohibited, the information registering section checks whether or not a first ID, which is the ID currently obtained by the information obtaining section, for registration is identical to any of second IDs, which are the IDs stored in the information storing section, and only if the first ID differs from each of the second IDs, the information registering section associates and registers the biometric information with the first ID currently obtained for registering by the information obtaining section in the information storing section, and when the information stored in the permissibility information file indicates that setting and registering of the duplicate ID, which is the same as an ID already registered in the information storing section and is shared by a plurality of persons, is permitted, regardless of whether or not the first ID currently obtained is identical to any of the second IDs stored in the information storing section, the information registering section associates and registers the biometric information with the second ID identical to the first ID currently obtained by the information obtaining section, or the information registering section associates and registers the biometric information with the first ID when the identical second ID does not exist.

2. The personal authentication apparatus according to claim 1, wherein when the ID of the person and the biometric information are obtained by the information obtaining section for authentication, the authenticating section retrieves the biometric information associated and stored with the same ID as the obtained ID from the information storing section, checks the biometric information currently obtained by the information obtaining section for authentication against the biometric information retrieved from the information storing section, and performs a different operation according to whether the authenticating section succeeds in the checking or fails in the checking.

3. The personal authentication apparatus according to claim 1, wherein the information obtaining section comprises a biometric information sensor which detects biometric information.

4. The personal authentication apparatus according to claim 3, wherein the biometric information sensor is a sensor which detects palm vein patterns.

5. The personal authentication apparatus according to claim 1, wherein the information registering section registers the new person's ID and biometric information obtained by the information obtaining section for registration only if the authenticating section authenticates an administrator who is a specific person among the persons whose IDs and biometric information are stored in the information storing section.

* * * * *